(12) United States Patent
Waltermann et al.

(10) Patent No.: US 10,997,183 B2
(45) Date of Patent: May 4, 2021

(54) DETERMINING TRENDS FOR A USER USING CONTEXTUAL DATA

(71) Applicant: Lenovo (Singapore) Pte. Ltd., Singapore (SG)

(72) Inventors: Rod D. Waltermann, Rougemont, NC (US); Hermann Franz Burgmeier, Chapel Hill, NC (US); Jonathan Gaither Knox, Morrisville, NC (US); Peter Hamilton Wetsel, Raleigh, NC (US); Suzanne Marion Beaumont, Wake Forest, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 631 days.

(21) Appl. No.: 14/098,033

(22) Filed: Dec. 5, 2013

(65) Prior Publication Data

US 2015/0161133 A1 Jun. 11, 2015

(51) Int. Cl.
| | | |
|---|---|---|
| *G06F 16/2457* | (2019.01) | |
| *G06F 16/33* | (2019.01) | |
| *G06F 16/2458* | (2019.01) | |
| *G06F 16/955* | (2019.01) | |
| *G06F 16/335* | (2019.01) | |

(52) U.S. Cl.
CPC .... *G06F 16/24578* (2019.01); *G06F 16/2477* (2019.01); *G06F 16/335* (2019.01); *G06F 16/3334* (2019.01); *G06F 16/955* (2019.01)

(58) Field of Classification Search
CPC ......... G06F 17/30029; G06F 17/30699; G06F 17/30702; G06F 17/30761; G06F 17/30766; G06F 17/30828; G06F 17/30528; G06F 17/3053; G06F 17/30551; G06F 17/30663; G06F 17/30876; G06F 16/24578; G06F 16/955; G06F 16/3334; G06F 16/2477; G06F 16/335
USPC ....................................................... 707/725
See application file for complete search history.

(56) References Cited

U.S. PATENT DOCUMENTS

| | | | |
|---|---|---|---|
| 6,611,881 B1* | 8/2003 | Gottfurcht et al. | 710/18 |
| 8,891,794 B1* | 11/2014 | Lin et al. | 381/315 |
| 8,949,250 B1* | 2/2015 | Garg et al. | 707/748 |
| 9,049,105 B1 | 6/2015 | Feinstein et al. | |
| 2002/0194222 A1 | 12/2002 | Kaply et al. | |
| 2008/0215170 A1* | 9/2008 | Milbrandt et al. | 700/94 |
| 2009/0234711 A1* | 9/2009 | Ramer | G06F 17/30749 705/14.66 |

(Continued)

FOREIGN PATENT DOCUMENTS

| | | |
|---|---|---|
| CN | 101963960 A | 2/2011 |
| CN | 102804222 A | 11/2012 |

*Primary Examiner* — Hosain T Alam
*Assistant Examiner* — Saba Ahmed
(74) *Attorney, Agent, or Firm* — Ference & Associates LLC

(57) ABSTRACT

An aspect provides a method, including: accessing, using a processor, a user profile based on user context information, wherein the user context information utilizes user device events; preparing, using the processor, a list of items based on the user profile related to a particular time period organized according to importance based on the user profile; and presenting, using the processor, the list of items related to the particular time period. Other aspects are described and claimed.

20 Claims, 3 Drawing Sheets

(56) References Cited

U.S. PATENT DOCUMENTS

| | | | |
|---|---|---|---|
| 2011/0040736 A1* | 2/2011 | Kalaboukis | G06F 21/6245 707/694 |
| 2011/0125763 A1* | 5/2011 | Takanen et al. | 707/749 |
| 2011/0161242 A1* | 6/2011 | Chung | G06Q 30/00 705/347 |
| 2011/0184247 A1* | 7/2011 | Contant | G06Q 10/10 600/300 |
| 2011/0264656 A1* | 10/2011 | Dumais | G06F 17/3087 707/728 |
| 2011/0283190 A1* | 11/2011 | Poltorak | G10L 13/033 715/716 |
| 2012/0078906 A1* | 3/2012 | Anand et al. | 707/737 |
| 2012/0143798 A1 | 6/2012 | Sundelin et al. | |
| 2012/0150888 A1* | 6/2012 | Hyatt | G06F 17/30528 707/758 |
| 2012/0215684 A1* | 8/2012 | Kidron | G06F 17/30867 705/39 |
| 2014/0046926 A1* | 2/2014 | Walton | G06Q 50/22 707/710 |
| 2014/0229860 A1 | 8/2014 | Rogers et al. | |
| 2014/0280138 A1* | 9/2014 | Li | G06Q 30/02 707/737 |
| 2015/0074259 A1* | 3/2015 | Ansari | H04L 67/02 709/224 |

\* cited by examiner

DETERMINING TRENDS FOR A USER USING CONTEXTUAL DATA

BACKGROUND

Information handling devices ("devices") come in a variety of forms, for example laptop computing devices, tablet computing devices, smart phones, and the like. Such devices are often mobile and carried by a user or otherwise routinely accessed by the user such that the user comes to rely on certain applications, e.g., calendar applications, GPS navigation applications, purchasing or Internet applications, etc. throughout their daily routine.

Certain devices provide applications that attempt to assist the user in organizing their activities. Among these applications are calendar applications that allow a user to make calendar entries, e.g., appointments, and set corresponding reminders for the calendar entries, e.g., reminder notification one hour prior a meeting. Some calendar applications provide a list that is provided, e.g., via email, to the user at the beginning of the day. The list may for example include all calendar appointments for an upcoming period of time, e.g., the day. Thus, the user is apprised of all calendar entries in the morning email such that the user can organize the day's activities and may be periodically reminded of upcoming events, e.g., meeting at a particular time, via an individual reminder linked to that meeting in the calendar application.

BRIEF SUMMARY

In summary, one aspect provides a method, comprising: accessing, using a processor, a user profile based on user context information, wherein the user context information utilizes user device events; preparing, using the processor, a list of items based on the user profile related to a particular time period organized according to importance based on the user profile; and presenting, using the processor, the list of items related to the particular time period.

Another aspect provides an information handling device, comprising: a processor; a memory device which stores instructions accessible to the processor, the instructions being executable by the processor to: access a user profile based on user context information, wherein the user context information utilizes user device events; prepare a list of items based on the user profile related to a particular time period organized according to importance based on the user profile; and present the list of items related to the particular time period.

A further aspect provides a product, comprising: a storage device having code stored therewith, the code comprising: code that accesses, using a processor, a user profile based on user context information, wherein the user context information utilizes user device events; code that prepares, using the processor, a list of items based on the user profile related to a particular time period organized according to importance based on the user profile; and code that presents, using the processor, the list of items related to the particular time period.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional solutions to organizing user's activities, e.g., calendaring applications, do not really help users based on what is currently important to them in a broad context. This is because such solutions tend to be application specific (e.g., calendar applications are limited to providing notifications/reminders regarding calendar entries) and thus tend to miss the broader context of the user's life that might derived from other information accessible to the device.

Accordingly, an embodiment provides for leveraging contextual data (e.g., user search history, user purchase history, calendar entries, current and past location events, people (e.g., device contacts) the user communicated with, as well as the contents of communications, collectively communication events, etc., to determine or infer user interests and how these interests influence the relevance or priority for upcoming user events. In other words, an embodiment provides a mechanism for determining what is of interest or trending for the device user right now and may thus be used to intelligently organize upcoming events accordingly.

The illustrated example embodiments will be best understood by reference to the figures. The following description is intended only by way of example, and simply illustrates certain example embodiments.

Figure 1:
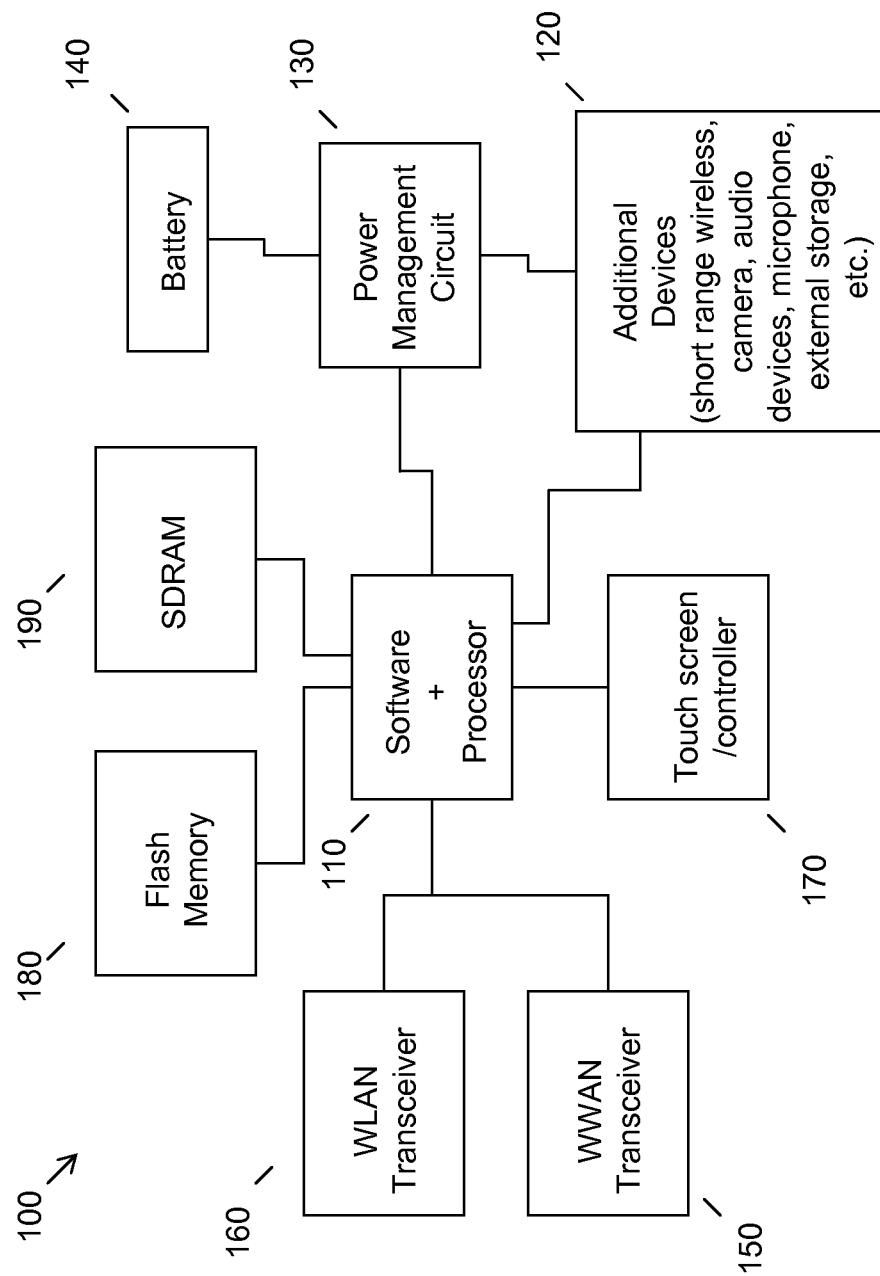
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally devices 120 are commonly included. System 100 often includes a touch screen 170 for data input and display/rendering. System 100 also typically includes various memory devices, for example flash memory 180 and SDRAM 190.

Figure 2:
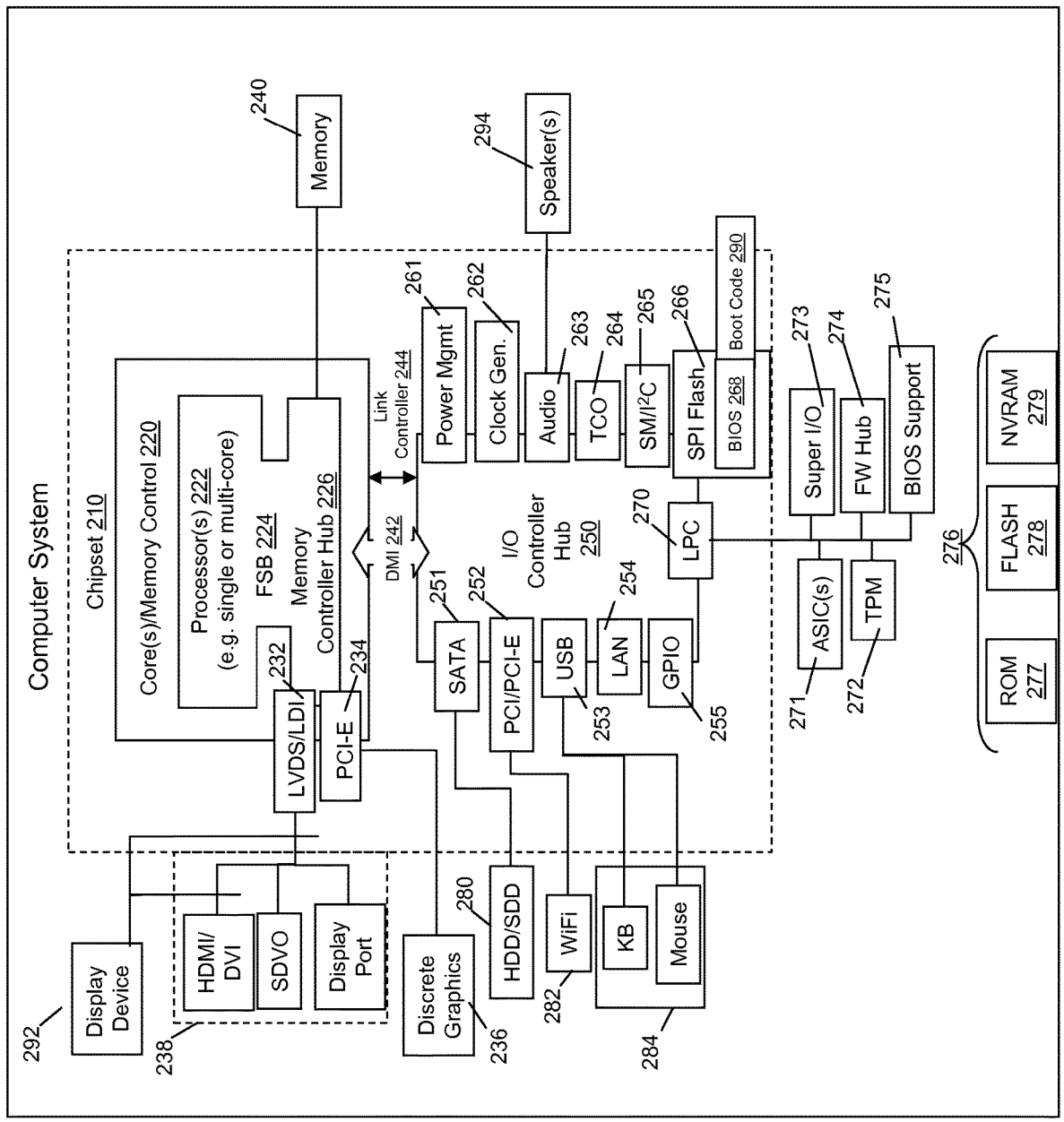
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be included in user devices such as a smart phone, a tablet computing device, a laptop computing device, etc., which a user employs in his or her daily life. Accordingly, the various functionality described in connection with the embodiments herein may be implemented on such a device using for example the circuitry outlined in FIG. 1 and/or FIG. 2.

Figure 3:
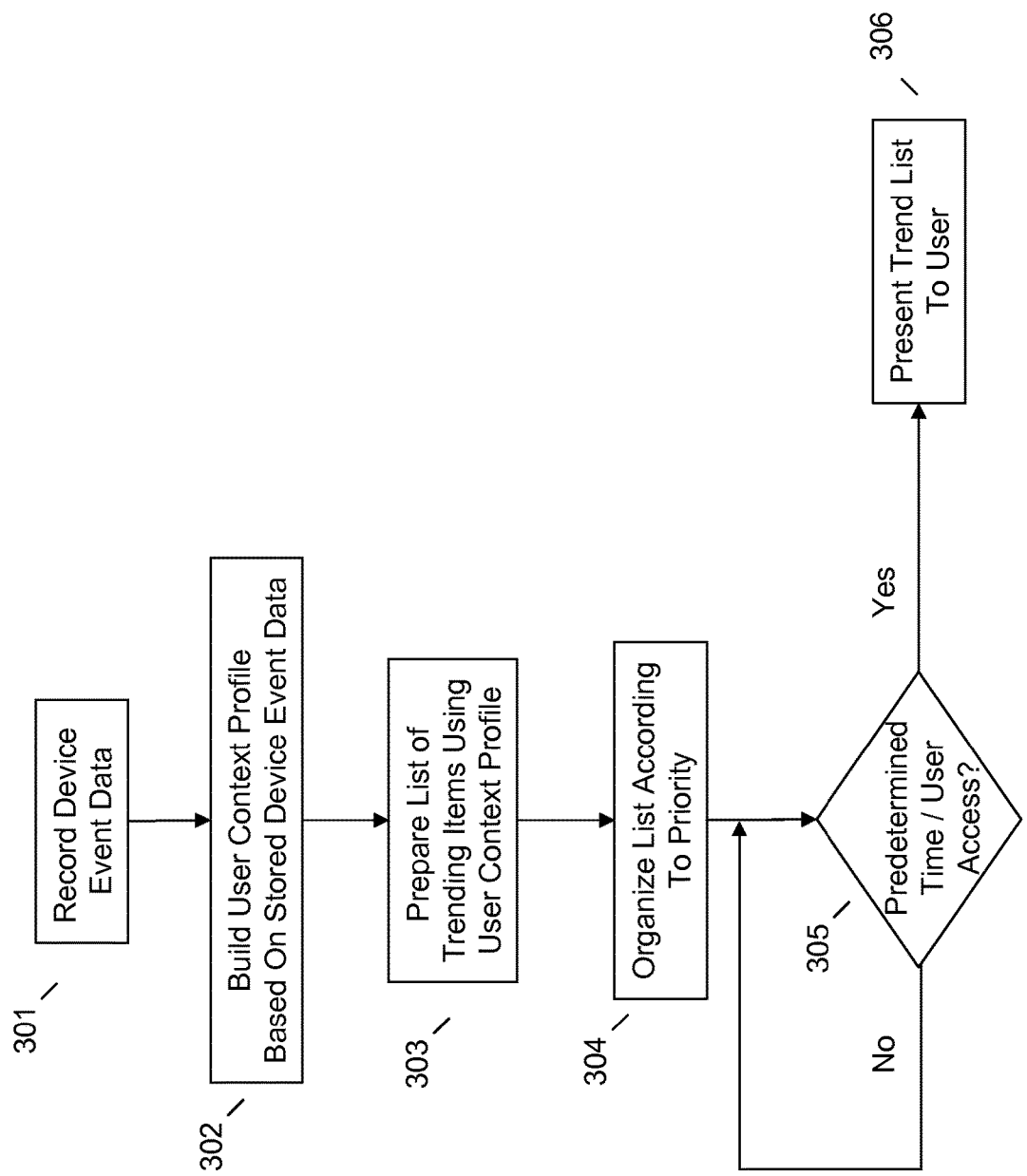
FIG. 3 illustrates an example method of determining trends for a user using contextual data.

In an embodiment, referring to FIG. 3, contextual data derived from a variety of sources is recorded at 301. For example, user device events such as communications received (and the contents of such communications), the user's purchasing activities, the user's locations (e.g., as sensed via GPS or other location technology), the user Internet searches or device searches generally (e.g., searches input to a navigation system, searches for user files stored on the device or a linked remote storage account, etc.) and the like may be recorded as device event data at 301.

With the availability of such user context information, an embodiment may build or determine a user profile at 302. For example, a user's habits, routines, important contacts, favorite locations, popular items purchased, frequently accessed files stored on a device, corresponding times related to such events, etc., may be used in forming a user profile at 302. Events that may be recorded and thus utilized may include but are not necessarily limited to recurring calendar entries/activities, user's habits (e.g., derived from past activities such as every morning the user stops to get coffee), current location of the user, past purchases of the user, people the user has communicated with frequently or repeatedly at a given time or range of time, as well as the contents of communications. Such contextual data is recorded at 301 and used to determine a profile at 302 of user interests and their relevance for that user right now.

The determining/refining of a user profile at 302 and/or the preparing of the list of trending items at 303 may for example be run early in the morning before the user typically gets up to look at the weather and/or what activities the user needs to prepare for. This way a quick summary of the day's activities can be organized at 304 and presented to the user at 306, as further described herein.

An embodiment may thus conduct at 302 and/or 303, e.g., according to a timing policy and/or in response to a user input instruction, a relevance pass that will cover, e.g., a given date range or time range, to analyze the user's current/future activities. For example, past device events (e.g., email received over night, voicemail received overnight) and future device events (e.g., calendar entry for an afternoon meeting) may be recorded as context data that is used in connection with other context information, e.g., available in the user's profile, to determine what's important or relevant to the user at certain upcoming times and/or places. This may be thought of as determining what is trending for the user in the upcoming time period, e.g., for today.

Given access to a user profile built up and refined (e.g., continually, periodically, according to a policy), an embodiment may compile a list of trending items using the context data available in the user's profile at 303. An embodiment may then organize this list based on the context data, e.g., according to priority, at 304. For example, an embodiment may infer that one upcoming event is more important or relevant than another, may ascertain certain upcoming events are high priority, etc., based on what is trending for the user that day.

Additionally or in the alternative, an embodiment may infer based on the context data, which may include explicit user instruction, select high priority events or context data, e.g., particular device contacts listed in a calendar entry for the day, which would be moved up in the organized list and always be treated as relevant, high priority, etc. For example a user's spouse may be indicated as a high priority contact and thus a calendar event of a specific type, e.g., birthday, related to that device contact may be promoted as high priority in the trending list. As another example, communications received, e.g., an email from a superior at work received overnight, might be promoted to the top of the list even if not included in a calendar entry, or to a position within the list prior to a calendar entry including this device contact, such that this event is notice by the user in a priority ordering.

Therefore, an embodiment may present a list of trending items, e.g., calendar events, email notifications requiring response, phone calls requiring response, daily routines or locations (even if not scheduled in a calendar application, e.g., getting coffee in the morning at a particular location), etc. This list may be presented at a predetermined time and/or in response to a user request for the list, e.g., as determined at 305. These items may be organized according to a user profile built using context data derived from device events such that a user will be apprised of relevant/interesting items in their trend list, e.g., for that day, organized according to an inferred relevance or importance, e.g., based on a user's profile.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   accessing, using a processor, a user profile comprising user context information, wherein the user context information corresponds to prior user device events associated with at least one daily activity of a user;
   preparing, using the processor, a list of future event items including at least one scheduled event based on the user profile, wherein the list of future event items is related to a particular upcoming time period;
   organizing the list of future event items according to importance by identifying a priority designation of stored contacts associated with each future event item in the list of future event items, wherein the organizing comprises prioritizing the future event items associated with higher priority stored contacts over the future event items associated with lower priority stored contacts; and
   presenting, using the processor, the organized list of the future event items to the user.

2. The method of claim 1, wherein the prior user device events include events selected from the group of events consisting of calendar entry events, device location related events, purchase events, and communication events.

3. The method of claim 1, wherein the presenting occurs at a predetermined time in the day.

4. The method of claim 3, wherein the predetermined time is user selectable.

5. The method of claim 1, wherein:
   the user profile includes priority information; and
   the organizing further comprises organizing the list of event items according to the priority information.

6. The method of claim 5, wherein the priority information is user selectable.

7. The method of claim 6, wherein the priority information is associated with one or more device contacts selected by the user as important.

8. The method of claim 5, wherein the priority information is associated with one or more device events based on a frequency metric.

9. The method of claim 1, wherein the accessing is performed according to a timing policy.

10. The method of claim 9, wherein the preparing and presenting are performed daily.

11. An information handling device, comprising:
    a processor;
    a memory device which stores instructions accessible to the processor, the instructions being executable by the processor to:
    access a user profile comprising user context information, wherein the user context information corresponds to prior user device events associated with at least one daily activity of a user;
    prepare a list of future event items including at least one scheduled event based on the user, wherein the list of future event items is related to a particular upcoming time period;
    organizing the list of future event items according to importance by identifying a priority designation of stored contacts associated with each future event item in the list of future event items, wherein the organizing comprises prioritizing the future event items associated with higher priority stored contacts over the future event items associated with lower priority stored contacts; and
    present the organized list of the future event items to the user.

12. The information handling device of claim 11, wherein the prior user device events include events selected from the group of events consisting of calendar entry events, device location related events, purchase events, and communication events.

13. The information handling device of claim 11, wherein the list of event items is presented at a predetermined time in the day.

14. The information handling device of claim 13, wherein the predetermined time is user selectable.

15. The information handling device of claim 11, wherein:
    the user profile includes priority information; and
    to organize further comprises organizing the list of event items according to the priority information.

16. The information handling device of claim 15, wherein the priority information is user selectable.

17. The information handling device of claim 16, wherein the priority information is associated with one or more device contacts selected by the user as important.

18. The information handling device of claim 15, wherein the priority information is associated with one or more device events based on a frequency metric.

19. The information handling device of claim 11, wherein the user profile is accessed according to a timing policy.

20. A product, comprising:
    a storage device having code stored therewith, the code comprising:
    code that accesses, using a processor, a user profile comprising user context information, wherein the user context information corresponds to prior user device events associated with at least one daily activity of a user;
    code that prepares, using the processor, a list of future event items including at least one scheduled event based on the user profile, wherein the list of future event items is related to a particular upcoming time period;
    code that organizes the list of future event items according to importance by identifying a priority designation of stored contacts associated with each future event item in the list of future event items, wherein the organizing comprises prioritizing the future event items associated with higher priority stored contacts over the future event items associated with lower priority stored contacts; and
    code that presents, using the processor, the organized list of the future event items to the user.

* * * * *